(12) United States Patent
Lin

(10) Patent No.: US 12,113,384 B2
(45) Date of Patent: Oct. 8, 2024

(54) DUAL BATTERY POWER MANAGEMENT SYSTEM AND ITS BATTERY CONTROLLER AND METHOD FOR CONTROLLING THE SAME

(71) Applicants: INVENTEC APPLIANCES (PUDONG) CORPORATION, Shanghai (CN); INVENTEC APPLIANCES CORPORATION, New Taipei (TW); INVENTEC APPLIANCES (SHANGHAI) CO. LTD., Shanghai (CN)

(72) Inventor: Ming-Tsan Lin, New Taipei (TW)

(73) Assignees: INVENTEC APPLIANCES (PUDONG) CORPORATION, Shanghai (CN); INVENTEC APPLIANCES CORPORATION, New Taipei (TW); INVENTEC APPLIANCES (SHANGHAI) CO. LTD., Shanghai (CN)

( * ) Notice: Subject to any disclaimer, the term of this patent is extended or adjusted under 35 U.S.C. 154(b) by 149 days.

(21) Appl. No.: 17/719,411

(22) Filed: Apr. 13, 2022

(65) Prior Publication Data

US 2023/0208155 A1 Jun. 29, 2023

(30) Foreign Application Priority Data

Dec. 29, 2021 (CN) .......................... 202111647153.1

(51) Int. Cl.
*H02M 1/36* (2007.01)
*H02J 7/00* (2006.01)
*H02M 3/158* (2006.01)

(52) U.S. Cl.
CPC .......... *H02J 7/0024* (2013.01); *H02J 7/0063* (2013.01); *H02J 7/00712* (2020.01); *H02M 3/158* (2013.01); *H02J 2207/20* (2020.01)

(58) Field of Classification Search
CPC .. H02M 3/1582; H02M 3/158; H02M 1/0032; H02M 1/36; H02J 7/0063;
(Continued)

(56) References Cited

U.S. PATENT DOCUMENTS 5,734,237 A * 3/1998 Engel ........................ H02J 7/02
318/268
11,005,277 B2 * 5/2021 Oukassi .................. H02M 3/18
(Continued)

FOREIGN PATENT DOCUMENTS

TW I532294 B 5/2016

*Primary Examiner* — Gabriel Agared
(74) *Attorney, Agent, or Firm* — WPAT, PC

(57) ABSTRACT

A dual battery power management system, its battery controller and method for controlling the same have been provided. The dual battery power management system includes a load module, a battery controller, a first battery and a second battery. The battery controller is electrically connected to the load module for receiving an electrical requirement demanded by the load module. The battery controller is provided with a DC-DC converter and a serial-parallel switch. The first battery is employed to provide a first input voltage which is converted to a converted DC voltage by the DC-DC converter. The second battery is electrically connected to the serial-parallel switch and is used to provide a second input voltage. Upon the aforementioned electrical requirement, the battery controller controls the series-parallel switch to be operated at a serial mode or a parallel mode.

8 Claims, 6 Drawing Sheets

(58) Field of Classification Search
CPC .. H02J 7/00712; H02J 7/0024; H02J 2207/20; Y02T 10/70
USPC .......................................................... 318/16
See application file for complete search history.

(56) References Cited

U.S. PATENT DOCUMENTS

| | | | |
|---|---|---|---|
| 2013/0088081 A1* | 4/2013 | Siri ........................ | H02J 3/381 |
| | | | 700/298 |
| 2016/0031341 A1* | 2/2016 | Komatsu ............... | B60L 15/007 |
| | | | 307/10.1 |
| 2018/0358823 A1* | 12/2018 | Lemmen ............. | H01M 10/425 |
| 2019/0283611 A1* | 9/2019 | Conlon ................... | H02J 3/322 |
| 2020/0412136 A1* | 12/2020 | Kristjansson ......... | H02J 7/0063 |
| 2022/0231537 A1* | 7/2022 | Hirota ....................... | H02J 7/16 |
| 2023/0155515 A1* | 5/2023 | Zhang .................... | H02M 7/12 |
| | | | 363/13 |
| 2023/0261487 A1* | 8/2023 | Cai .......................... | H02J 7/00 |
| | | | 320/128 |

* cited by examiner

DUAL BATTERY POWER MANAGEMENT SYSTEM AND ITS BATTERY CONTROLLER AND METHOD FOR CONTROLLING THE SAME

CROSS-REFERENCE TO RELATED APPLICATION

This non-provisional application claims priority under 35 U.S.C. § 119(a) to Invention Patent Application No. 202111647153.1 filed in the People's Republic of China on Dec. 29, 2021, the entire contents of which are hereby incorporated by reference.

BACKGROUND

Technical Field

The instant disclosure generally relates to a battery control system in the application of electric vehicles, and specifically relates to a dual battery power management system and its battery controller and method for controlling the same.

Related Art

As the rapid development of power electronics technology, along with the global environmental protection trend of energy saving and carbon reduction, the vehicle consumer is more and more willing to acquire electric vehicles. Thus, such a significant change stimulates the vehicle industry to invest vast resources on development, manufacturing and sales of the electric vehicles (EVs).

Usually, the electronic control framework of the electric vehicle mainly includes a battery module, a motor controller unit, and a motor assembly. For electric vehicles, it is indeed difficult for a single battery pack to meet the user's needs for maximum output power and driving range at the same time in various driving scenarios such as low-speed, high-speed, or uphill (increased load) drives. Therefore, the conventional art proposes a composite battery system combining a high-energy battery and high-power battery to achieve this purpose, such as Taiwan Patent No. 1532294 entitled "portable composite battery system" is an example. However, Taiwan Patent No. 1532294 discloses a "parallel" composite battery system which a high-energy battery pack and a high-power battery pack are connected in parallel to provide better output power according to the load requirements. However, the overall output voltage is still limited by the output voltage of any battery packs, though the output voltage is usually limited by the high-current battery pack).

SUMMARY

It is therefore an object of the present disclosure to provide a dual battery power management system, its battery controller and method for controlling the same by using dual batteries to optimize the trade-off issues between horsepower and driving range as well.

It is another object of the present disclosure to provide the dual battery power management system, its battery controller and method for controlling the same which are operated between a series mode and a parallel mode. The dual batteries are connected in series under the series mode and connected in parallel under the parallel mode. The battery controller is employed to generate a driving voltage in a linear manner without suffering from stepwise variations while switching between the series mode and the parallel mode.

To attain the objects, a dual battery power management system is set forth and provided. The dual battery power management system comprises: a load module, a battery controller, a first battery and a second battery. The battery controller is electrically connected to the load module for receiving an electrical requirement from the load module, wherein the battery controller has a DC-DC converter and a series-parallel switch. The first battery is electrically connected to the DC-DC converter, for providing a first input voltage which is converted into a converted DC voltage by the DC-DC converter. The second battery is electrically connected to the series-parallel switch for providing a second input voltage. The battery controller controls the series-parallel switch to be operated at either a series mode or a parallel mode in response to the electrical requirement. The series-parallel switch controls the converted DC voltage and the second input voltage to be a series output voltage applying to the load module under the series mode. The series-parallel switch controls the converted DC voltage and the second input voltage to be a parallel output voltage applying to the load module under the parallel mode.

In some embodiments, the battery controller further comprises a processor for receiving the electrical requirement and controlling the DC-DC converter and the series-parallel switch in response to the electrical requirement.

In some embodiments, the load module comprises a motor and motor driver.

In some embodiments, the dual battery power management system further comprises a charger utilized to charge the first battery.

Moreover, a battery controller, electrically connected to a first battery and a second battery, to be operated at either a series mode or a parallel mode in response to an electrical requirement provided by a load module is provided and set forth. The battery controller comprises a DC-DC converter and a series-parallel switch. The DC-DC converter is employed for receiving a first input voltage provided by the first battery and converting the first input voltage into a converted DC voltage. The series-parallel switch is employed for receiving the converted DC voltage and a second input voltage provided by the second battery. The series-parallel switch controls the converted DC voltage and the second input voltage to be a series output voltage applying to the load module under the series mode. The series-parallel switch controls the converted DC voltage and changes the second input voltage to be a parallel output voltage applying to the load module under the parallel mode.

In some embodiments, the battery controller further comprises a processor for receiving the electrical requirement and controlling the DC-DC converter and the series-parallel switch in response to the electrical requirement.

Furthermore, a method for controlling a battery controller which is electrically connected to a first battery and second batter and operated at either a series mode or a parallel mode in response to an electrical requirement provided by a load module is provided and set forth. The method comprises the following steps of: providing a DC-DC converter for receiving a first input voltage provided by the first battery and converting the first voltage into a converted DC voltage; and providing a series-parallel switch for receiving the converted DC voltage and a second input voltage provided by the second battery; wherein the series-parallel switch controls the converted DC voltage and the second input voltage to be a series output voltage applying to the load module under the series mode; wherein the series-parallel switch controls the converted DC voltage and changes the second input voltage to be a parallel output voltage applying to the load module under the parallel mode.

In some embodiments, the method further comprises: providing a processor for receiving the electrical requirement and controlling the DC-DC converter and the series-parallel switch in response to the electrical requirement; switching the parallel mode to the series mode in response to a first threshold by the processor; and switching the series mode to the parallel mode in response to a second threshold by means of the processor.

In some embodiments, the method further comprises: adjusting a duty cycle of the converted DC voltage by means of pulse-width modulation (PWM) while switching the parallel mode to the series mode.

In some embodiments, the first threshold is the second input voltage and the second threshold is 90% of the second input voltage.

In some embodiments, the method further comprises providing a charger utilized to charge the first battery.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
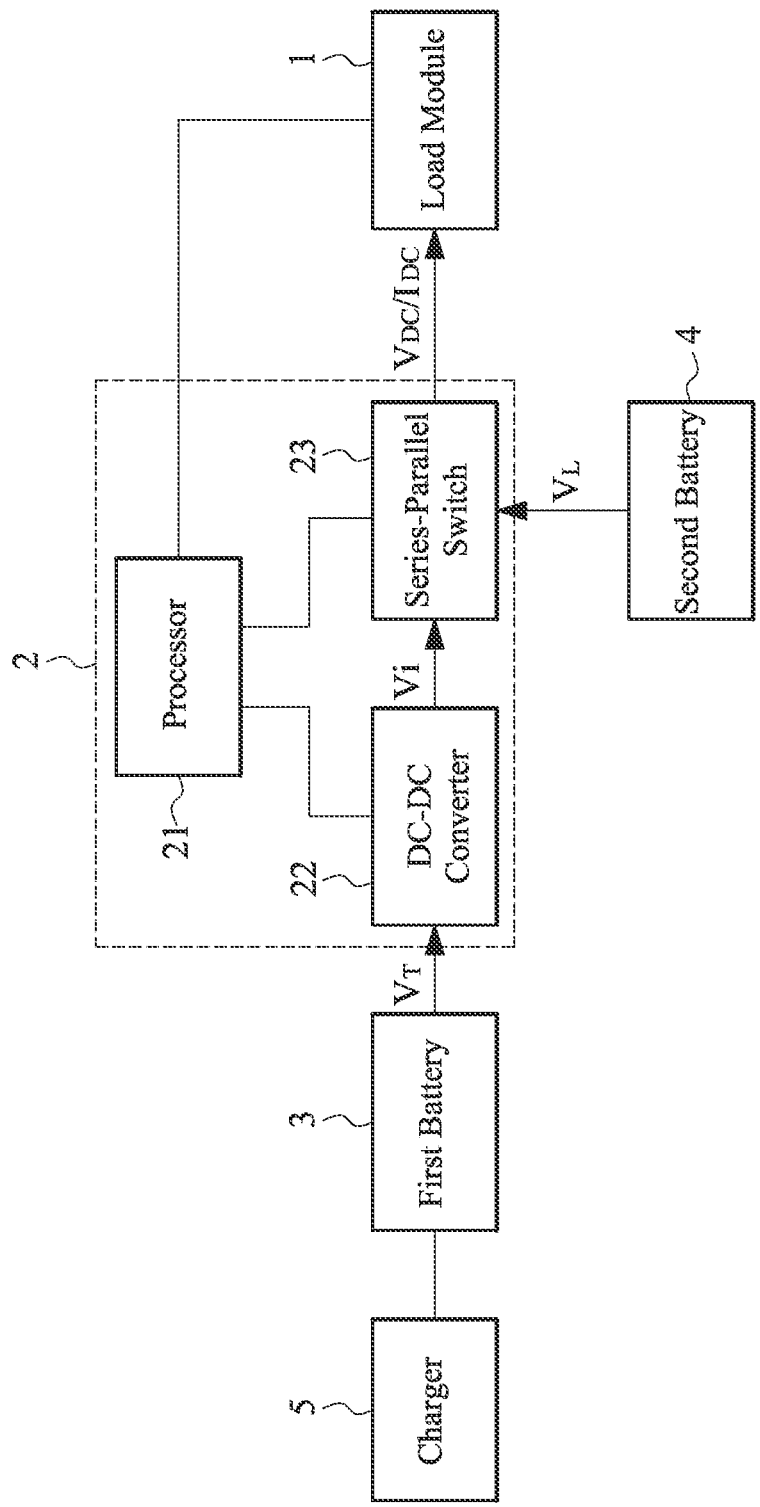
FIG. 1 schematically illustrates the block diagram of the dual battery power management system in accordance with one preferred embodiment of the present disclosure.

As shown in FIG. 1, the block diagram of the dual battery power management system in accordance with one preferred embodiment of the present disclosure is schematically illustrated. In FIG. 1, the dual battery power management system includes a load module 1, a battery controller 2, a first battery 3, a second battery 4 and a charger 5. It is noted that the dual battery power management system in accordance with the present disclosure can be applied to any electric vehicle including, but not limited, two-wheeled or four-wheeled vehicles.

As shown in FIG. 1, the load module 1 usually includes a load driver and a load. The load driver is employed to receive a driving voltage $V_{DC}$ that can be used to drive the load. The driving current $I_{DC}$ varies in accordance with the variation in the power consumed by the load. In other words, the load driver sends a request of "appropriate" driving voltage $V_{DC}$, or a so-called "electrical requirement," to the battery controller 2 so as to generate the required driving voltage for adaptively controlling the load module accordingly. In the application of electric vehicles, the load module 1 is a motor assembly which usually includes a motor and a motor driver. As for the motor assembly, the battery controller 2 provides a smaller driving voltage $V_{DC}$ and greater driving current $I_{DC}$ while the motor operates at low-speed; however, the battery controller 2 provides a greater driving voltage $V_{DC}$ while the motor relatively operates at high-speed.

In addition, the battery controller 2 includes a processor 21, a DC-DC converter 22 and a series-parallel switch 23. The processor 21 communicates data/control signals with the DC-DC converter 22 and the series-parallel switch 23 via a communication interface such as CAN-Bus or RS-485. As such, the processor 21 can be used to identify the required driving voltage or the electrical requirement from the load module 1 under various driving scenarios. According to the electrical requirement from the load module 1, the DC-DC converter 22 and the series-parallel switch 23 are controlled to be operated at either a series mode or a parallel mode. Further referring to FIG. 1, the DC-DC converter 21 receives a first input voltage $V_T$ generated by the first battery 3 and converts it to a converted DC voltage Vi to be applied to the series-parallel switch 23. Further, the series-parallel switch 23 receives the converted DC voltage Vi and a second input voltage $V_L$ provided by the second battery 4. Generally speaking, the processor 21 controls the DC-DC converter 22 and the series-parallel switch 23 to be operated at the series mode or the parallel mode in accordance with the electrical requirement provided by the load module 1.

According to the present disclosure, the series-parallel switch 23 is employed to generate the driving voltage $V_{DC}$ to be the sum of the converted DC voltage Vi and the second voltage $V_L$, that is, $V_{DC}=(Vi+V_L)$, under the series mode. Under the circumstance, such greater driving voltage $V_{DC}$ can be therefore applied to the load module 1. If the load module 1 is the motor assembly, the greater driving voltage $V_{DC}$ means that the input driving voltage is increased for the motor driver and motor speed is therefore increased. As such, the driving power for the motor is increased with reference to the formula "Motor Power=Voltage*Current=Torque*Speed." It is noted that the series mode can be utilized at the scenario of high-speed drive.

Alternately, the series-parallel switch 23 is used to generate the driving voltage $V_{DC}$ to be equivalent to the converted DC voltage Vi and the second voltage $V_L$, that is, $V_{DC}=Vi=V_L$, under the parallel mode. Under the circumstance, such smaller driving voltage $V_{DC}$ can be therefore applied to the load module 1. If the load module 1 is the motor assembly, the smaller driving voltage $V_{DC}$ means that the input driving current is increased for the motor driver and motor torque is therefore increased. It is noted that the parallel mode can be utilized at the scenario of low-speed drive or increased-load drive.

Figure 2:
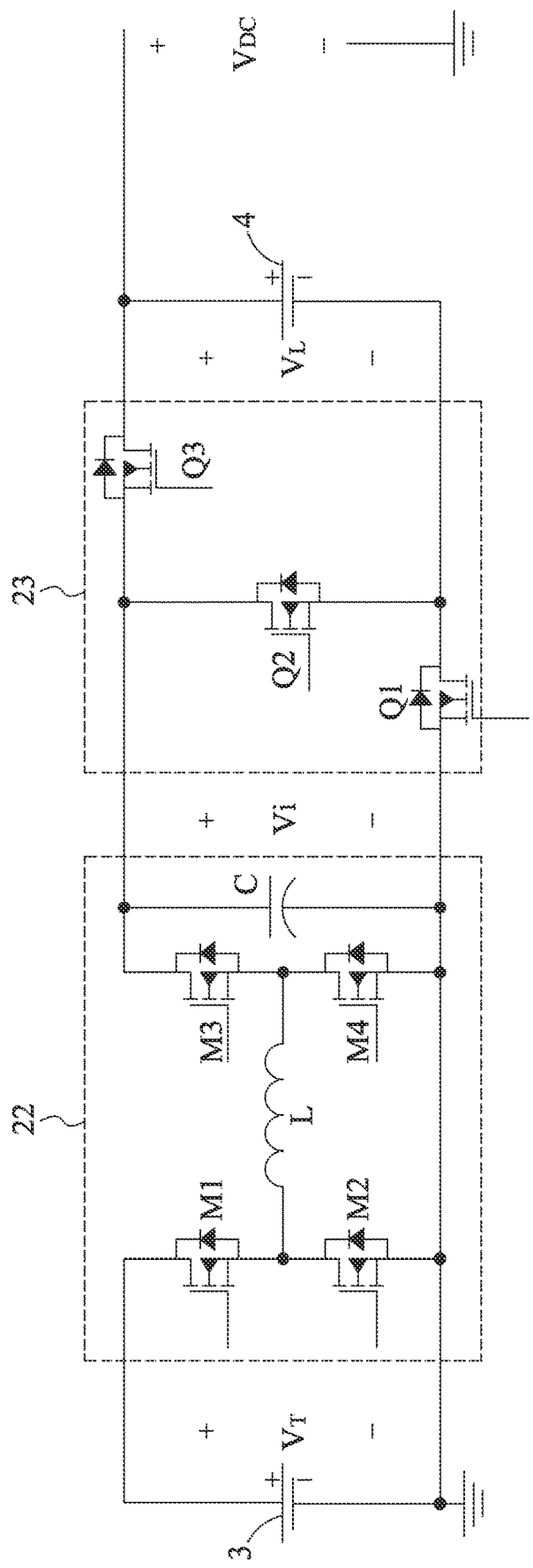
FIG. 2 schematically illustrates one exemplary circuit diagram of the DC-DC converter and the series-parallel switch as shown in FIG. 1.

As further shown in FIG. 2, one exemplary circuit diagram of the DC-DC converter 22 and the series-parallel switch 23 as shown in FIG. 1 is schematically illustrated. It is noted that the circuit diagram as shown in FIG. 2 is merely one exemplary embodiment, not intended to limit the scope of the present disclosure. In FIG. 2, the DC-DC converter 22 includes four transistors M1, M2, M3 and M4, one inductor L and one capacitor C. If the transistor M1 and M2 are both exemplified to be NMOS transistors, the transistor M1 has its drain and source connected to the positive terminal of the first battery 3 and the drain of the transistor M2, respectively; furthermore, the transistor M2 has its source connected to the negative terminal of the first battery 3. Moreover, if the transistor M3 and M4 are exemplified to be NMOS transistors, both of which are connected in series with each other and together connected in parallel with the capacitor C, the converted DC voltage Vi is generated across the pair terminals of the capacitor C. Moreover, the transistor M3 has its drain and source connected to the one terminal of the capacitor C and the drain of the transistor M4, respectively; furthermore, the transistor M4 has its source connected to the other terminal of the capacitor C. In addition, the inductor L has two terminals connected to the source of the transistor M1 and the source of the transistor M3, respectively. Certainly, the gates of the transistors M1-M4 are all controlled by the processor 21.

Further referring to FIG. 2, the series-parallel switch 23 includes three transistors Q1, Q2 and Q3 which are exemplified to be NMOS transistors. The transistor Q1 has its source and drain connected to the source of the transistor M4 and the negative terminal of the second battery 4, respectively. The transistor Q3 has its source and drain connected to the drain of the transistor M3 and the positive terminal of the second battery 4, respectively. The transistor Q2 has its drain and source connected to source of the transistor Q3 and the drain of the transistor Q1, respectively. Certainly, the processor 21 controls all the gates of the transistors Q1, Q2 and Q3.

Referring to FIG. 2, when the transistor Q2 is turned on and the transistors Q1 and Q3 are turned off under the series mode, the DC-DC converter 22 is controlled to adjust the converted DC voltage Vi so as to provide the driving voltage $V_{DC}=Vi+V_L$. Alternately, when the transistors Q1 and Q3 are turned on and the transistor Q2 is turned off under the parallel mode, the DC-DC converter 22 is controlled to adjust the converted DC voltage Vi so as to provide the driving voltage $V_{DC}=Vi=V_L$. Further according to the present disclosure, while switching from the parallel mode to the series mode, the processor 21 is utilized to control the DC-DC converter 22 by means of linear modulation, preferably, Pulse-Width Modulation (PWM). In other words, the converted DC voltage Vi is generated by linearly adjusting its duty cycle thereof to be $Vi=D*V_T$ wherein D designates its duty cycle and $V_{DC}=Vi+V_L=D*V_T+V_L$. In accordance with the present disclosure, the total driving voltage $V_{DC}$ under the series mode can be adjusted linearly to avoid the drawback of stepwise variation.

Figure 3A:
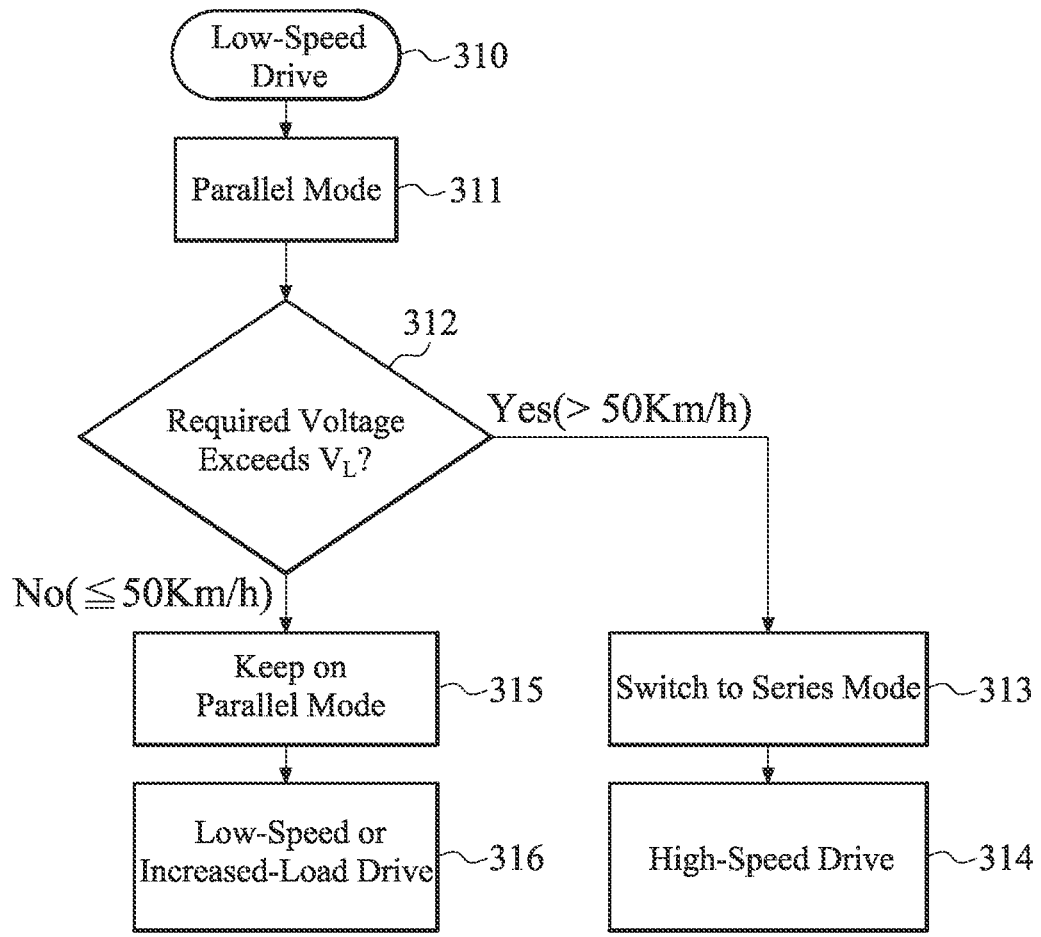
FIG. 3A schematically illustrates the flow chart for controlling the battery controller of FIG. 1 under the scenario of low-speed drive.

Referring to FIG. 3A, the flow chart for controlling the battery controller 2 of FIG. 1 under the scenario of low-speed drive is schematically illustrated. At first, the electric vehicle is operated under the scenario of start-up or low-speed drive in Step 310 and the battery controller 2 is operated under the parallel mode in Step 311, that is, the driving voltage $V_{DC}=Vi=V_L$. Then, the flow proceeds to determine if the required driving voltage exceeds $V_L$ in Step 312. In Step 312, the load module 1 determines the required speed/power and sends the electrical requirement to the battery controller 2. If the required driving voltage exceeds $V_L$, the flow proceeds to Step 313 for switching from the parallel mode to the series mode and make the driving voltage $V_{DC}=Vi+V_L$. Then, the flow proceeds to Step 314 to be operated under the scenario of high-speed drive which the driving voltage $V_{DC}=Vi+V_L=D*V_T+V_L$ is generated by means of adjusting the duty cycle of PWM and generate the driving voltage required for the load module 1 in accordance with the electrical requirement provided by the load module 1. However, if the required driving voltage is determined not to exceed VL in Step 312, the flow keeps on the parallel mode in Step 315, which the driving voltage $V_{DC}$ keeps on $V_{DC}=Vi=V_L$. Then, the vehicle keeps on the scenario of low-speed drive or increased-load drive in Step 316.

Figure 3B:
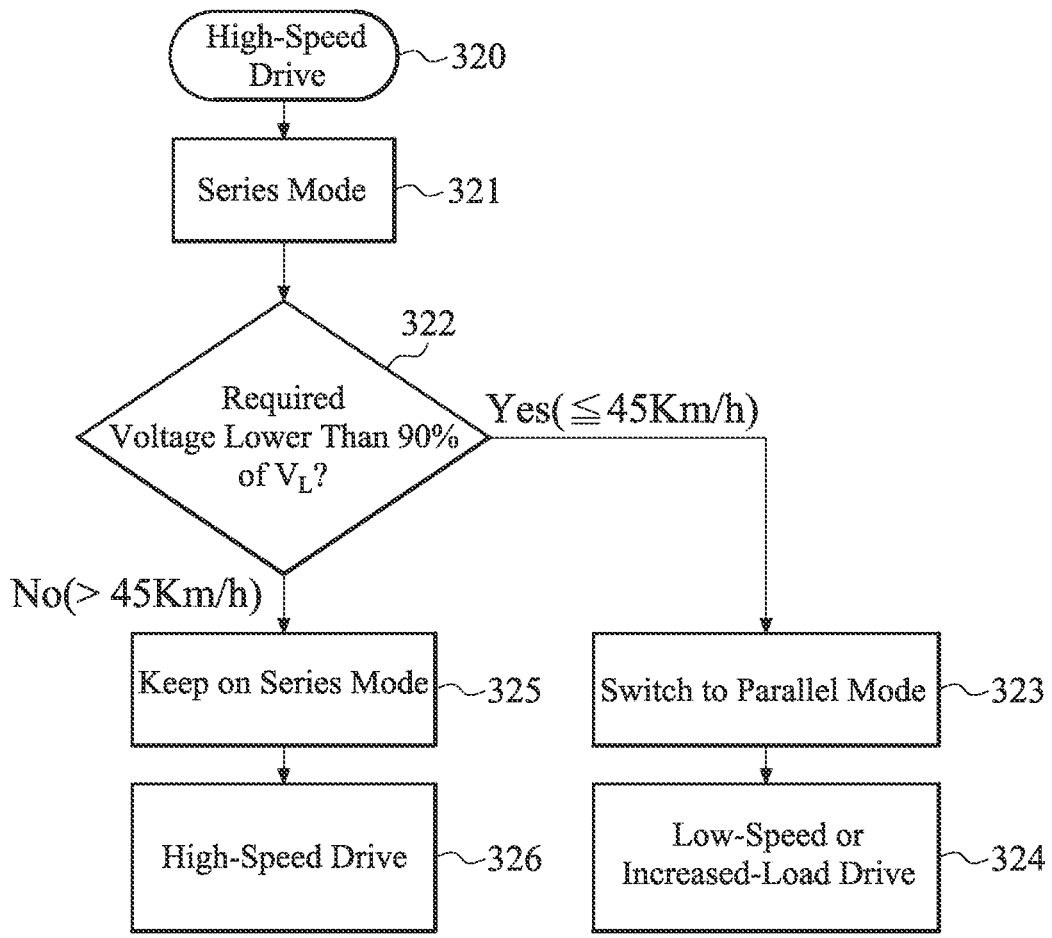
FIG. 3B schematically illustrates the flow chart for controlling the battery controller of FIG. 1 under the scenario of high-speed drive.

Referring to FIG. 3B, the flow chart for controlling the battery controller of FIG. 1 under the scenario of high-speed drive is schematically illustrated. At first, the electric vehicle is operated under the scenario of high-speed drive in Step 320 and the battery controller 2 is operated under the series mode in Step 321, that is, the driving voltage $V_{DC}=Vi+V_L$. Then, the flow proceeds to determine if the required driving voltage is lower than 90% of $V_L$ in Step 322. In Step 322, the load module 1 determines the required speed/power and sends the electrical requirement to the battery controller 2. If the required driving voltage is lower than 90% of $V_L$, the flow proceeds to Step 323 for switching from the series mode to the parallel mode and make the driving voltage $V_{DC}=Vi=V_L$. Then, the flow proceeds to Step 324 to be operated under the scenario of low-speed drive or increased-load drive. However, if the required driving voltage is determined exceeds 90% of $V_L$ in Step 322, the flow keeps on the series mode in Step 325, which the driving voltage $V_{DC}$ keeps on $V_{DC}=Vi+V_L$. Then, the vehicle keeps on the scenario of high-speed drive in Step 326.

Figure 3C:
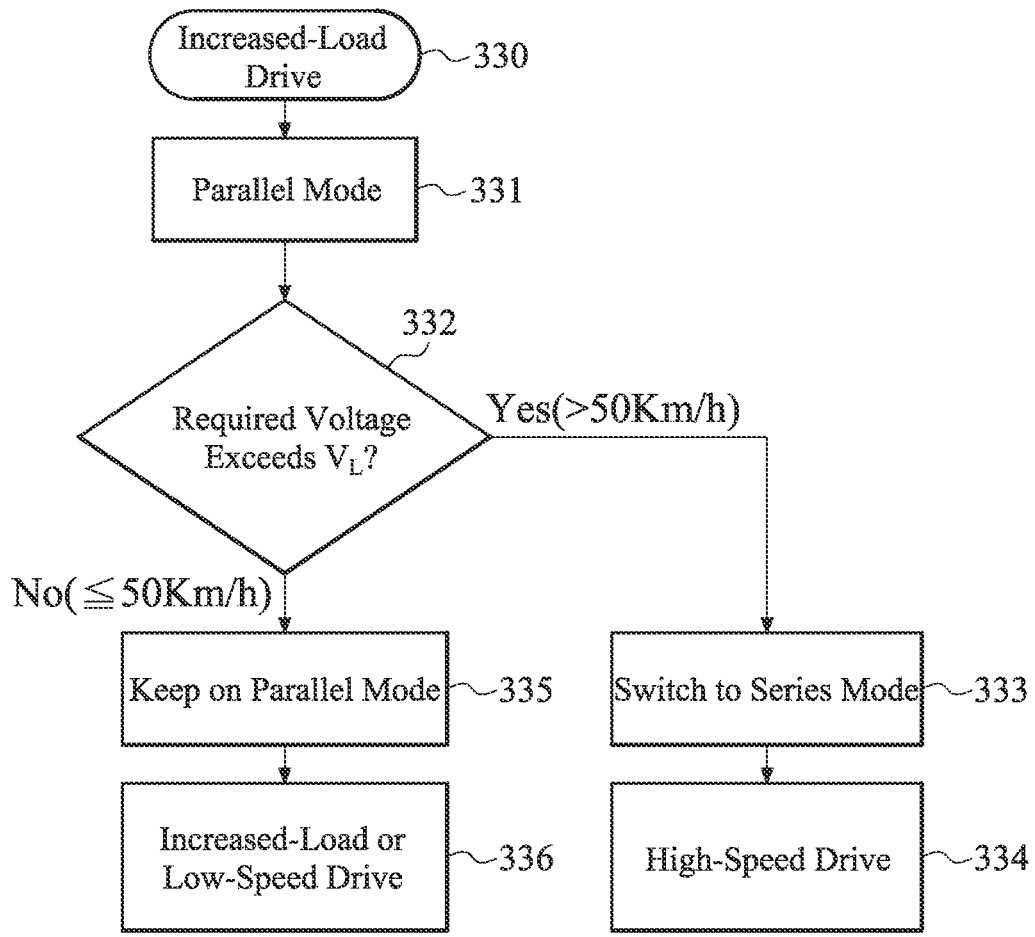
FIG. 3C schematically illustrates the flow chart for controlling the battery controller of FIG. 1 under the scenario of increased-load drive.

Referring to FIG. 3C, the flow chart for controlling the battery controller of FIG. 1 under the scenario of increased-load drive is schematically illustrated. At first, the electric vehicle is operated under the scenario of uphill drive or increased-load drive in Step 330 and the battery controller 2 is operated under the parallel mode in Step 331, that is, the driving voltage $V_{DC}=Vi=V_L$. Then, the flow proceeds to determine if the required driving voltage exceeds $V_L$ in Step 332. In Step 332, the load module 1 determines the required speed/power and sends the electrical requirement to the battery controller 2. If the required driving voltage exceeds $V_L$, the flow proceeds to Step 333 for switching from the parallel mode to the series mode and make the driving voltage $V_{DC}=Vi+V_L$. Then, the flow proceeds to Step 334 to be operated under the scenario of high-speed drive which the driving voltage $V_{DC}=Vi+V_L=D*V_T+V_L$ is generated by means of adjusting the duty cycle of PWM and generate the driving voltage required for the load module 1 in accordance with the electrical requirement provided by the load module 1. However, if the required driving voltage is determined not to exceed $V_L$ in Step 332, the flow keeps on the parallel mode in Step 335, which the driving voltage $V_{DC}$ keeps on $V_{DC}=Vi-V_L$. Then, the vehicle keeps on the scenario of low-speed drive or increased-load drive in Step 336.

Further referring to two scenarios as shown in FIGS. 3A and 3C, the flow includes the step of determining if the required driving voltage exceed $V_L$, that is, a first threshold. To the contrary, under the scenario as shown in FIG. 3B, the flow includes the step of determining if the required driving voltage is lower than 90% of $V_L$, that is, a second threshold. Apparently, the first threshold ($V_L$) is greater than the second threshold ($0.9V_L$). The gap between the first threshold and the second threshold designates a "switch hysteresis range" as shown in FIG. 4.

Figure 4:
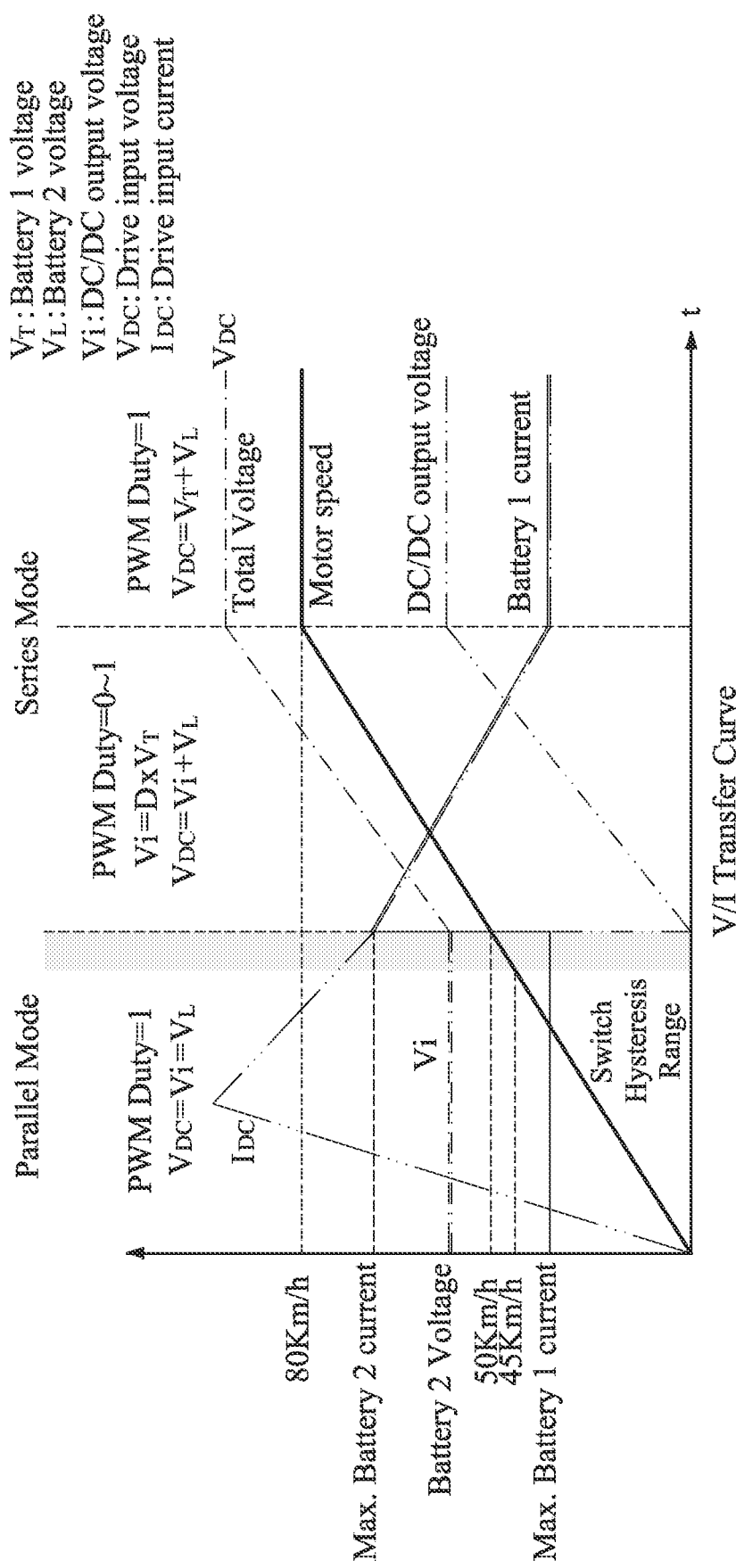
FIG. 4 schematically illustrates the voltage/current transfer curve of the dual battery power management system as shown in FIG. 1.

As shown in FIGS. 4, the voltage/current transfer curve of the dual battery power management system as shown in FIG. 1 is schematically illustrated. In FIG. 4, the driving voltage $V_{DC}$ is gradually and linearly varied by adjusting its duty cycle thereof to be $Vi=D*V_T$, as mentioned above, when the system is switched from the parallel mode to the series mode. In accordance with the present disclosure, the total driving voltage $V_{DC}$ under the series mode can be adjusted linearly to avoid the drawback of stepwise variation. Specifically, the DC-DC converter 22 generates the converted DC voltage Vi by the linear modulation under the control of the processor 21. Preferably, the linear modulation can be implemented by means of Pulse-Width Modulation (PWM) method. In other words, the converted DC voltage Vi is generated by linearly adjusting its duty cycle thereof to be $Vi=D*V_T$ wherein D designates its duty cycle and $V_{DC}=Vi+V_L=D*V_T+V_L$. In accordance with the present disclosure, the total driving voltage VDC under the series mode can be adjusted linearly to avoid the drawback of stepwise variation.

While the present disclosure has been described by way of example and in terms of the preferred embodiments, it is to be understood that the present disclosure needs not be limited to the disclosed embodiments. For anyone skilled in the art, various modifications and improvements within the spirit of the present disclosure are covered under the scope of the present disclosure. The covered scope of the present disclosure is based on the appended claims.

What is claimed is:

1. A dual battery power management system, comprising:
  a load module;
  a battery controller, electrically connected to the load module, for receiving an electrical requirement from the load module, wherein the battery controller has a DC-DC converter and a series-parallel switch connected to the DC-DC converter;
  a first battery, electrically connected to the DC-DC converter, for providing a first input voltage which is converted into a converted DC voltage by the DC-DC converter and the converted DC voltage is applied to the series-parallel switch; and
  a second battery, electrically connected to the series-parallel switch, for providing a second input voltage applied to the series-parallel switch;
  wherein the battery controller controls the series-parallel switch to be operated at either a series mode or a parallel mode in response to the electrical requirement;
  wherein the series-parallel switch controls the converted DC voltage and the second input voltage to be a series output voltage applied to the load module under the series mode;
  wherein the series-parallel switch controls the converted DC voltage and the second input voltage to be a parallel output voltage applied to the load module under the parallel mode;
  wherein the battery controller comprises a processor for receiving the electrical requirement and controlling the DC-DC converter and the series-parallel switch in response to the electrical requirement;
  switching the parallel mode to the series mode in response to a first threshold by the processor; and
  switching the series mode to the parallel mode in response to a second threshold by means of the processor.

2. The dual battery power management system according to claim 1, wherein the load module comprises a motor and motor driver.

3. The dual battery power management system according to claim 1, further comprising a charger utilized to charge the first battery.

4. A battery controller, electrically connected to a first battery and a second battery, to be operated at either a series mode or a parallel mode in response to an electrical requirement provided by a load module, comprising:
  a DC-DC converter for receiving a first input voltage provided by the first battery and converting the first input voltage into a converted DC voltage; and
  a series-parallel switch for receiving the converted DC voltage and a second input voltage provided by the second battery;
  wherein the series-parallel switch controls the converted DC voltage and the second input voltage to be a series output voltage applied to the load module under the series mode; wherein the series-parallel switch controls the converted DC voltage and the second input voltage to be a parallel output voltage applied to the load module under the parallel mode;
  wherein the battery controller comprises a processor for receiving the electrical requirement and controlling the DC-DC converter and the series-parallel switch in response to the electrical requirement;
  switching the parallel mode to the series mode in response to a first threshold by the processor; and
  switching the series mode to the parallel mode in response to a second threshold by means of the processor.

5. A method for controlling a battery controller which is electrically connected to a first battery and second batter and operated at either a series mode or a parallel mode in response to an electrical requirement provided by a load module; the method comprising:
  providing a DC-DC converter for receiving a first input voltage provided by the first battery and converting the first voltage into a converted DC voltage; and
  providing a series-parallel switch for receiving the converted DC voltage and a second input voltage provided by the second battery;
  wherein the series-parallel switch controls the converted DC voltage and the second input voltage to be a series output voltage applied to the load module under the series mode; wherein the series-parallel switch controls the converted DC voltage and the second input voltage to be a parallel output voltage applied to the load module under the parallel mode;
  providing a processor for receiving the electrical requirement and controlling the DC-DC converter and the series-parallel switch in response to the electrical requirement;
  switching the parallel mode to the series mode in response to a first threshold by the processor; and
  switching the series mode to the parallel mode in response to a second threshold by means of the processor.

6. The method according to claim 1, further comprising: adjusting a duty cycle of the converted DC voltage by means of pulse-width modulation (PWM) while switching the parallel mode to the series mode.

7. The method according to claim 6, wherein the first threshold is the second input voltage and the second threshold is 90% of the second input voltage.

8. The method according to claim 1, further comprising: providing a charger utilized to charge the first battery.

* * * * *